United States Patent

Sheu

[11] Patent Number: 5,905,833
[45] Date of Patent: May 18, 1999

[54] OPTICAL FIBER CABLE HAVING AN IMPROVED FILLING MATERIAL WITHIN ITS CORE

[75] Inventor: Jim Jenqtsong Sheu, Dunwoody, Ga.

[73] Assignee: Lucent Technologies Inc., Murray Hill, N.J.

[21] Appl. No.: 08/886,494

[22] Filed: Jul. 1, 1997

[51] Int. Cl.$^6$ .................................................. G02B 6/44
[52] U.S. Cl. ..................... 385/109; 385/100; 385/113; 523/173; 528/15
[58] Field of Search ........................ 385/100–114, 109; 523/173; 528/15, 31, 32; 427/288, 387; 428/392, 375

[56] References Cited

U.S. PATENT DOCUMENTS

| | | | |
|---|---|---|---|
| 4,701,016 | 10/1987 | Gartside et al. | 350/96.23 |
| 4,867,526 | 9/1989 | Arroyo | 350/96.23 |
| 4,900,126 | 2/1990 | Jackson et al. | 350/96.23 |
| 5,187,763 | 2/1993 | Tu | 385/100 |
| 5,455,881 | 10/1995 | Bosisio et al. | 385/100 |

*Primary Examiner*—Phan Palmer

[57] ABSTRACT

A cable 20 of this invention includes at least one core 22 comprising a plurality of coated optical fibers 25 and a filling material 26 which is disposed about the fibers 25. Typically, the fibers 25 and the filling material 26 are disposed within a tubular member 28 which is disposed within a sheath system 27. The sheath system 27 may include longitudinally extending strength members 30 in addition to a plastic jacket 32. The filling material made in accordance with the preferred embodiment of the present invention is one which comprises at least two different hydrocarbons as an oil constituent and/or two different fumed silicas as part of a thickening agent. The hydrocarbon(s) may be a synthetic oil such as polyalphaolefin, for example, or a mineral oil, or a combination of synthetic oils and/or mineral oils. The combination of oils is used to help low temperatures properties as well as better incorporate a gelling system which may include a copolymer. A copolymer is used mainly to reduce oil separation. Additionally, a combination of gelling agents such as mixtures of two different fumed silicas is used to build a more stable and desirable network structure in the filling material. The novel combination of oils and fumed silicas produces a filling material capable of passing EIA/TIA Standard FOTP-81, Compound Flow (Drip) Test for Filled Optical Cable, Section 8 up to 80° C. and has a critical-yield stress of less than about 0.002 psi.

51 Claims, 2 Drawing Sheets

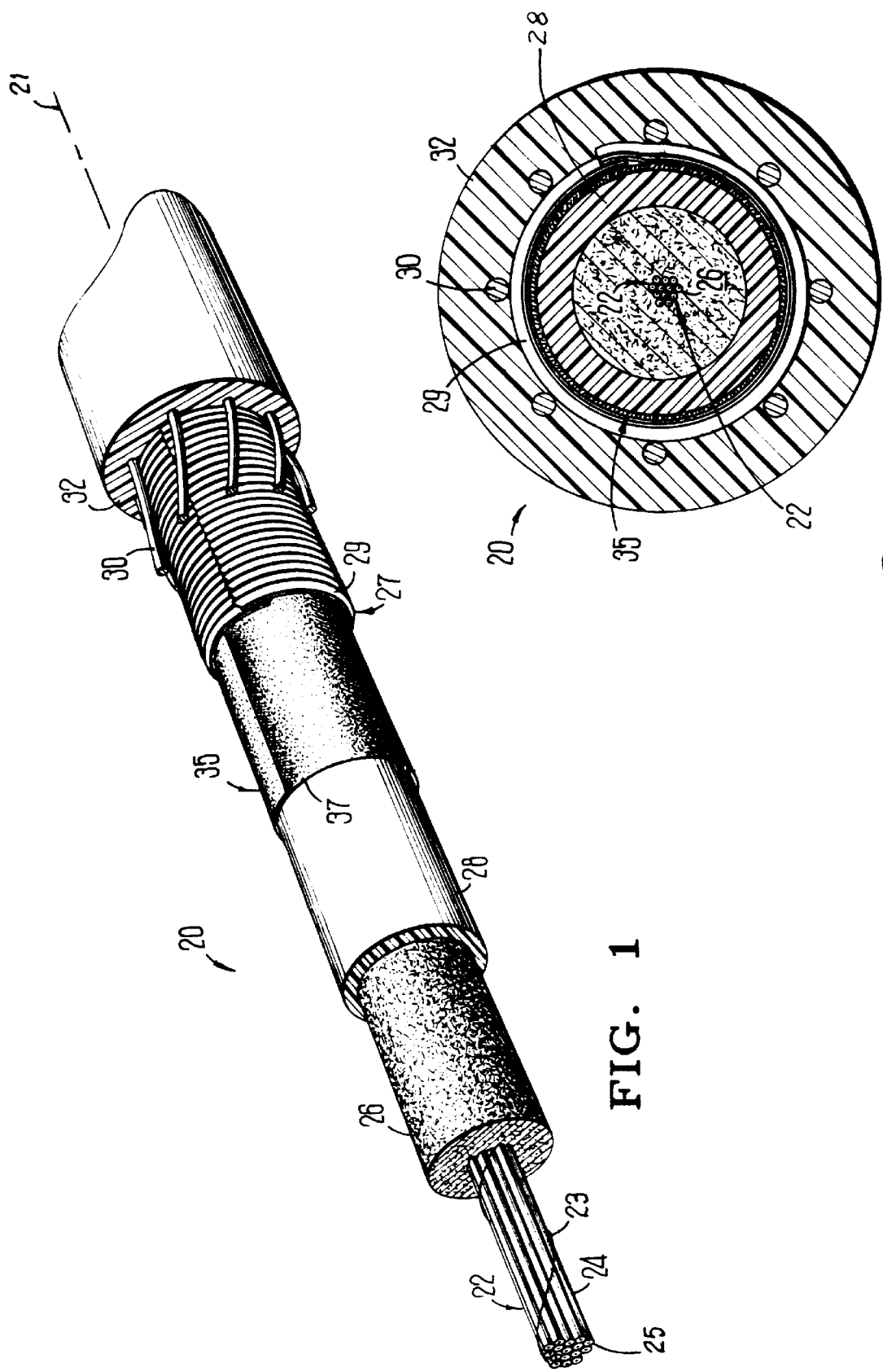

OPTICAL FIBER CABLE HAVING AN IMPROVED FILLING MATERIAL WITHIN ITS CORE

TECHNICAL FIELD

This invention relates to an optical fiber cable having a filling material within its core, and more particularly to a filling material that resists dripping at elevated temperatures.

BACKGROUND OF THE INVENTION

In the communications cable industry, it is well known that changes in ambient conditions lead to differences in water vapor pressure between the inside and the outside of a plastic cable jacket. This generally operates to diffuse moisture in a unidirectional manner from the outside of the cable to the inside of the cable. Eventually, this will lead to an undesirably high moisture level inside the cable, especially if a plastic jacket is the only barrier to the ingress of the moisture. High levels of condensed moisture inside a cable sheath system may have a detrimental effect on the transmission characteristics of communications cables whether the particular transmission media is metallic conductors or optical fibers. The presence of moisture is particularly destructive when the cable will be exposed to colder environments where the moisture may freeze and introduce physical stresses and strains on the fiber. Furthermore, moisture may enter the cable because of damage to the cable if the integrity of the cable's sheath system is compromised. For example, rodent and/or termite attacks, as well as external mechanical impacts or forces may cause openings in the sheath system of the cable to occur, allowing water to enter, and, if not controlled, to move longitudinally along the cable into splice closures. Consequently, it should be no surprise that cables for transmitting communications signals must meet industry standards with respect to water-blocking provisions. For example, one industry standard requires that there be no transmission of water under a pressure head of one meter in one hour through a one meter length of cable.

In the prior art, various techniques have been used to prevent the ingress of water through the sheath system of a cable and along the core. For example, sometimes a metallic shield is used to protect a telecommunications cable against lightning, rodent and/or termite attacks. However, the forming of such a shield about a cable core requires the use of relatively low manufacturing line speeds. Also, the use of a metallic shield negates certain benefits resulting from what may otherwise be an all-dielectric optical fiber cable. Further in this regard, any lightning strikes attracted to the metal, as well as gradual corrosion, may cause holes in a metallic shield.

It is not uncommon to include provisions in addition to or as an alternative to a metallic shield for preventing the ingress of water into the core. Filling materials have been used to fill cable cores and to coat portions of cable sheath systems to prevent the longitudinal movement of any water which enters the cable. However, due to their physical make-up, the use of such materials often cause housekeeping problems for field personnel, particularly during splicing operations.

Typically, the compositions of matter used as filling materials, sometimes referred to as waterblocking materials, are semisolid or semiliquid substances that comprise a thickening or gelling agent in a liquid carrier. In optical fiber cables, a further important function of a filling material is the maintenance of the optical fibers in a low stress state as well as the chemical compatibility of the material to the various coating and color layers on the optical fiber itself.

A communications cable filling material, especially an optical fiber cable filling material, should meet a variety of requirements, including industry-standard drip tests. To pass these tests, the physical properties of a cable having such filling materials in its core must remain within acceptable limits over a rather wide temperature range e.g., from about −40° C. to about 80° C. In other words, the filling material should not drip out of cable even at 80° C. Oil separation is a property of a gel-like material which describes the tendency to bleed oil during its lifetime. What is desired is a filling material which has an oil separation no greater than 4% when centrifuged at relative centrifugal forces of 27,000 g at 25±2° C. for two hours.

Further complicating the optical fiber cable situation is that suitable filling materials must yield under strains experienced when the cable is made or handled. Otherwise, movement of the optical fibers within the cable would be prevented and the fibers would buckle because they contact, with a relative small periodicity a surface of the unyielding filling material. Such contact with an unyielding surface unfortunately introduces a large amount of microbending loss in the signal being carrier by that fiber.

In order to adequately address the concerns raised above, filling materials for use in optical fiber cables should have a relatively low shear modulus, $G_e$. However, it has been determined that, at least for some applications, a low value of $G_e$ of the filling material is not sufficient to assure low cabling loss, and that a further parameter, the critical-yield stress, $\sigma_c$, may need to be controlled because it also affects the optical performance of fibers in a cable containing common types of filling materials.

One filling material having a relatively low critical-yield stress is disclosed in U.S. Pat. No. 4,701,016 which issued on Oct. 20, 1987 in the names of (C. H. Gartside, III, et al. The disclosed filling material comprises oil, a gelling agent such as colloidal particles, and optionally, a bleed inhibitor. It includes 93% by weight of mineral oil and 7% by weight of hydrophobic fumed silica. Among oils useful in the practice of the invention are ASTM type (ASTM D-226 test) p103, 104A, or 104B, naphthenic oils having a minimum specific gravity of about 0.860 and a maximum pour point (ASTM D97) of less than approximately −4° C., and polybutene oils of minimum specific gravity of about 0.83 and a maximum pour point (ASTM D97) of less than about 18° C. The colloidal particle filler material preferably comprises silica particles. The critical-yield stress of the filling material of the '016 patent is not greater than about 70 Pa (or about 0.01 psi), measured at 20° C., whereas the shear modulus is less than about 13 kPa (or about 1.89 psi), at 20° C.

Another filling material that is attractive for use in optical fibers is described in commonly-assigned U.S. Pat. No. 5,187,763 issued in the name of C. F. Tu on Feb. 16, 1993. However, even though the filling material set forth in the '763 patent adequately addresses some of the technical concerns recited above, it does not provide the necessary properties at elevated temperatures, i.e. about 80° C. In particular, this disclosed filling material does not appear capable of capable of passing EIA/TIA Standard FOTP-81, Compound Flow (Drip) Test for Filled Optical Cable, Section 8 up to 80° C. while maintaining other desired properties such as a critical-yield stress of less than about 0.002 psi.

Because cable drip is related to oil separation, constraints on the sought after filling material include oil separation and critical-yield stress. In addition, the viscosity of the sought-after filling material is important with respect to processing. These constraints usually are antagonistic to each other. For example, a reduction of oil separation and an increase in cable drip temperature require high viscosity and critical-yield stress whereas to facilitate processing and to reduce optical loss requires low viscosity and critical-yield stress.

SUMMARY OF THE INVENTION

The foregoing problems have been solved by a cable of this invention having the improved filling material within its core. The cable of this invention includes at least one core comprising at least one optical fiber transmission medium, an improved filling material disposed about the fibers, and a sheath system which is disposed about the core. The improved filling material enables the cable to pass EIA/TIA Standard FOTP-81, Compound Flow (Drip) Test for Filled Optical Cable, Section 8 up to 80° C. without adversely effecting any other operational performance characteristics of the cable.

In one embodiment, the improved filling material comprises 1) at least two different hydrocarbons whose viscosity values are separated by at least about three centistroke at 100° C., 2) a thickening system which comprises an inorganic constituent and a polymer, and 3) an antioxidant.

In another embodiment, the alternative filling material comprises 1) a thickening system comprising an inorganic constituent which includes at least two different fumed silicas and a polymer, 2) at least one hydrocarbon, and 3) an antioxidant.

BRIEF DESCRIPTION OF THE DRAWINGS

Other features of the present invention will be more readily understood from the following detailed description of specific embodiments thereof when read in conjunction with the accompanying drawings, in which:

FIG. 1 is a perspective view of an optical fiber cable of this invention which has a core in which is disposed a filling material;

FIG. 2 is an end view in section of the cable of FIG. 1; and

DETAILED DESCRIPTION

Figure 3:
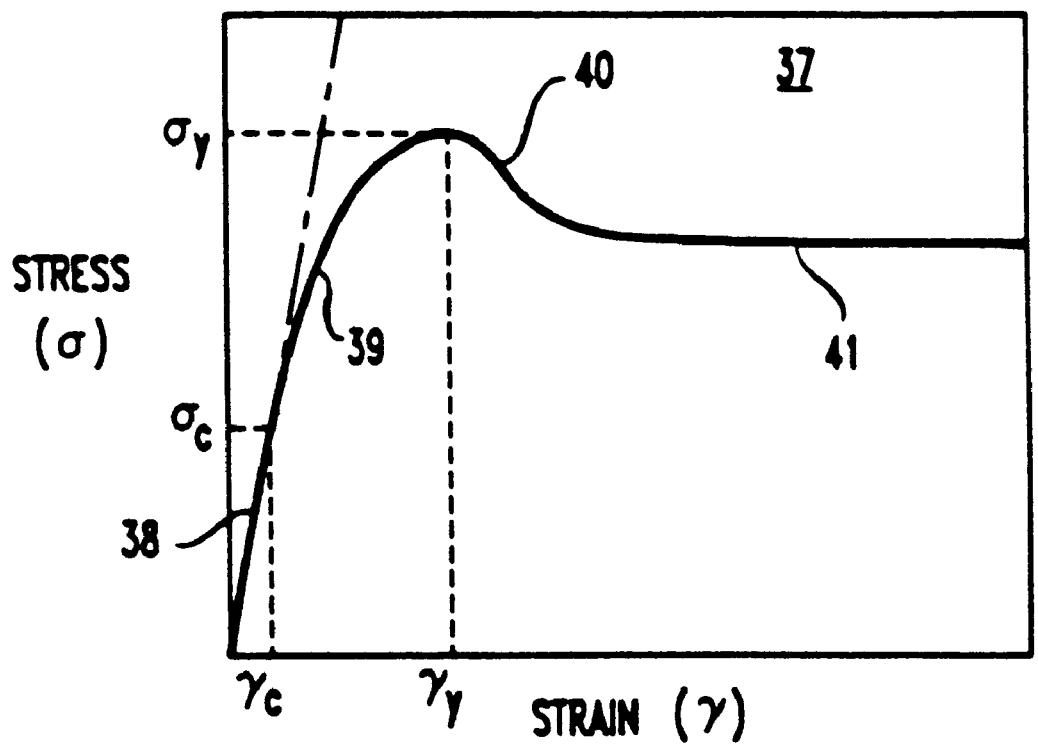
FIG. 3 depicts a generalized stress-strain curve of a filling material made in accordance with the present invention.

Referring now to FIGS. 1 and 2, there is shown a communications cable which is designated generally by the numeral 20 and which has a longitudinal axis 21. It includes a core 22 comprising optical fibers 25—25 which may be arranged in one or more units 24—24. Each of the optical fibers is provided with a protective coating system which typically includes an inner primary coating layer and an outer secondary coating layer. Also, each of the coated fibers may be buffered with an outer layer of polyvinyl chloride (PVC), for example. Each of the units 24—24 may be wrapped with a binder ribbon 23. The core 22 includes a filling material 26 which is disposed within a tubular member 28 of a sheath system 27. The tubular member 28 often is referred to as a core tube.

The tubular member 28 may be enclosed by a metallic shield 29 and an outer plastic jacket 32. The sheath system 27 also may include strength members 30—30. Also, a waterblocking tape 35 may be wrapped about an outer surface of the core tube 28. The tape 35 may be a waterblocking tape which is disclosed, for example, in U.S. Pat. No. 4,867,526 which issued on Sep. 19, 1989 in the name of C. J. Arroyo. Also, the filling material 26 may be used to fill the core of a cable which includes optical fiber ribbons such as those disclosed in U.S. Pat. No. 4,900,176 which issued on Feb. 13, 1990 in the names of K. W. Jackson, et al. and which is expressly incorporated by reference hereinto.

Technical constraints on sought-after filling materials comprising an oil constituent and intended for use in optical fiber cables include oil separation, cable drip temperature, critical-yield stress and viscosity of the filling material. As mentioned hereinbefore, these constraints very often are antagonistic to each other or to other desired properties of the communications cable.

The critical-yield stress of a filling material is considered to affect the optical performance of fibers in a cable filled with the filling material. The prior art non-drip filling material, as disclosed in the previously mentioned '763 Tu patent which is expressly incorporated by reference herein, typically has a critical-yield stress of riot less than about 0.003 psi (20.7 Pa) at room temperature in order to pass a drip test performed at 65° C. The critical-yield stress of the desired filling material 26 should be such that it does not cause an increase in optical fiber loss over that of prior art filling materials at all temperatures. As stated in the Background, it is not believed that any of the prior art materials are able to pass a drip test at 80° C. while maintaining a critical-yield stress of less than about 0.003 psi (20.7 Pa). As a matter of note, the indiscriminitory use of gelling agents such as fumed silica material or polymer will rapidly increase the critical-yield stress and also undesirably change the other properties of the filling material.

The desired viscosity characteristics for the filling material are directed toward accommodating processing concerns more so than concerns regarding cable performance. The viscosity of prior art filling material as measured by a helipath viscometer falls in the range of 15 to 45 units using T spindle (Tb) at room temperature about three days after the material is made. Within certain limits, the lower the viscosity, the easier the filling material can be processed into an optical cable. In this regard, it is desired that the viscosity of any newly developed filling materials be in the general vicinity of that of prior art filling materials so that presently available processing facilities can be used.

The present application identifies two specific aspects of the composition of the filling material that significantly enhance its operation within a communications cable. In general, the first deals with the purposeful inclusion of two different hydrocarbons selected from the group consisting of two synthetic oils and two mineral oils, that have viscosity values that are at least about three centistrokes at 100° C. apart from each other. By comparison, the second novel aspect disclosed herein recognizes the benefits of purposely utilizing two different fumed silicas within the thickening system of the filling material. It has been determined that unexpected synergistic effects occur when even one of the compositional approaches referenced above is used in a filling material. In fact, it appears that these compositions allow communication cables to pass the recently elevated 80° C. drip test while maintaining other technical characteristics, such as critical-yield stress, oil separation and viscosity, within their desired parameters as presently accepted by the industry.

According to the first aspect listed above, the composition of matter of a filling material 26 preferably includes an oil constituent system which is a combination or mixture of at least two different hydrocarbons, which can be either aliphatic or aromatic in type. More specifically, the two hydrocarbons are preferably either two different synthetic oils or two different mineral oils. As a point of clarity, the present invention classifies the oils or hydrocarbons as different if their viscosity values are separated by at least about three centistrokes at 100° C. The preferred oil constituent is in the range of about 85 to about 95 percent by weight of the filling material and the hydrocarbons have a relatively high molecular weight, i.e. in excess of about 500.

In a particular preferred embodiment of the present invention, the composition of the filling material includes about 89.2% by weight of a combination of synthetic oils, for example, polyalphaolefins such as SHF 82 and SHF 402 oil available from the Mobil Chemical Corporation. More specifically, an optimum ratio of SHF 82 to SHF 402 has been found to be about 3.4.

As a matter of completeness, the SHF 402 has an average molecular weight of about 1760 Mn, while the SHF 82 has an average molecular weight of about 690 Mn. The viscosity of the SHF 402 oil at 10° C. is approximately 40 centistokes. The viscosity of the SHF 82 oil at 100° C. is approximately 8 centistokes. The resulting combination of oils has a pour point of less than −40° C. The polyalphaolefin aliphatic hydrocarbons are preferably characterized by a viscosity greater than about 8 centistokes at 100° C. Likewise, preferred polybutene oils and preferred mineral oils also have a viscosity greater than about 8 centistokes at 100° C.

Typically, it is beneficial to thicken the oil constituent so that it will not run out of a cable and so that oil separation is reduced. As stated earlier, oil separation or syneresis is a property of a gel-like filling material which describes the tendency to bleed oil during the lifetime of the filling material. Some prior art filling materials are known to separate oil if left undisturbed for a certain period of time. The syneresis is usually a slow process and, therefore, has to be determined by an accelerated method, for example, centrifugation. As mentioned hereinbefore, it is desired that the filling material 26 be characterized by a 4% maximum oil separation when centrifuged at a relative centrifugal force of 27,000 g at 25±2° C. for two hours. In order to accomplish this, inorganic and organic thickening agents are included in the composition of the filling material.

Colloidal fillers such as a fumed silica may be used as inorganic thickening agents. Colloidal filler particles in oil gel the oil by bonding surface hydroxyl groups to form a network structure in which the carrier is held by intermolecular and capillary forces. Such gels are capable of supporting a load below a critical value of stress. Above this stress level, the network is disrupted, and the material assumes a liquid-like character and flows under stress. Such behavior often is referred to as thixotropic and is desirable to facilitate processing as well as to reduce microbending loss.

Typically, microbending loss in optical fiber cables is more difficult to control at long transmission wavelengths than at short ones. Thus the requirements on the mechanical properties of a fiber cable filling material are typically substantially more severe for cable that is to be used at 1.55 μm, for example, than they are if the cable is to be used at shorter operating wavelengths of 1.3 μm, for example. Although, it has been found that some prior art filling materials perform quite satisfactorily at wavelengths up to about 1.3 μm, it has also been found that this is often not the case at longer wavelengths.

Because silica-based optical fibers typically have their lowest losses at or near the 1.55 μm wavelength, there is great interest in operating optical fiber telecommunication systems at approximately that wavelength. Furthermore, the newer fibers produced today have much higher transmission rate and capacity and typically operate at long wavelengths. Thus, it is important to have available optical fiber cable that has no significant cabling-induced losses at long wavelengths, including about 1.55 μm.

In general, colloidal fillers useful in the cable 20 include colloidal silica, either hydrophilic or hydrophobic, preferably a hydrophobic fumed silica having a BET surface area between about 50 and about 400 $m^2$/gm. As understood throughout the industry and used herein, BET surface area refers to a type of gas-absorption measurement based on Brunauer, Emmett and Teller (BET) Theory. The higher the surface area, the lower the oil separation. An increase in the fumed silica level decreases oil separation, but adversely increases the critical-yield stress and the viscosity of the gel.

Now turning specifically to the second aspect of the filling material of this application as listed above, one example of a thickening system in accordance with a preferred embodiment of the present invention is a combination of a polydimethylsiloxane-treated fumed silica and a dimethyidichlorosilane partial treated fumed silica. The former, namely the polydimethylsiloxane-treated fumed silica, ideally having a BET surface area of about 80–120 $m^2$/gm and containing greater than 4.5% by weight carbon. Such materials are available from the Cabot Corporation of Tuscola, Ill. under the trade name Cab-O-Sil TS-720 and Degussa Corp of Frankfurt, Germany under the trade designation of Aerosil US202, R202 and US204. The dimethyidichlorosilane partial treated fumed silica, ideally has a BET surface area of about 105–135 $m^2$/gm and contains about 0.85% by weight carbon. Such materials are available from the Cabot Corporation of Tuscola, Ill. under the trade designation Cab-O-Sil TS-610 and Degussa Corp. of Frankfurt, Germany under the trade designation of Aerosil R972 or R974.

An exemplary hydrophilic colloidal material is fumed silica with a BET surface area of about 175–225 $m^2$/gm, nominal particle size of 0.012 μm, and a specific gravity of 2.2, available from the Cabot Corporation under the designation Cab-O-Sil M-5 and from Degussa Corp. of Frankfurt, Germany under the trade designation of Aerosil 200. Other colloidal fillers that may be useful in the practice of the invention include precipitated silicas and clays such as bentonites, with or without surface treatment. In the preferred embodiment, a combination of hydrophobic fumed silicas consisting of Cab-O-Sil TS-720 fumed silica and Cab-O-Sil TS-610 fumed silica, in the combined amount of about 4 to 8 percent by weight, is used as the inorganic thickening agent. More specifically, in the preferred embodiment, the ratio of TS-720 to TS-610 is preferably at about 0.8.

In addition to the compositional attributes discussed above, oil retention of the filling material 26 may be further improved by the addition of one of more organic thickening agents or bleed inhibitors to the composition of the filling material. Copolymers, such as rubbers, used as bleed inhibitors are known to reduce the oil separation of a gel-like filling material, and unlike fumed silica, does not contribute as much to increasing yield stress and viscosity.

The bleed inhibitor may be a block copolymer, a relatively high viscosity semiliquid, sometimes referred to as semisolid, rubber, or other appropriate rubber. Block copolymers and semiliquid rubbers may be referred to collectively as rubber polymers. Incorporating a rubber polymer into the gel-like composition of matter allows a reduction in the amount of colloidal particles that must be added to the mixture to prevent syneresis of the gel. Furthermore, it makes possible the formulation of non-bleeding compositions having a relatively low critical-yield stress.

Among the block copolymers that can be used in filling materials for the cable of this invention are styrene-rubber and styrene-rubber-styrene block copolymers having a styrene/rubber ratio between approximately 0.1 and 0.9 and a molecular weight, as indicated by Brookfield viscosity in toluene at 25° C., of from about 100 cps to more than about 50,000 cps in a 25% by weight rubber solution. Exemplary block copolymers include (1) a styrene-ethylene propylene block copolymer (SEP), unplasticized, having a styrene/rubber ratio of about 0.59, a specific gravity of about 0.92, a break strength per ASTM D-412 of 300 psi, and being available from tie Shell Chemical Company of Houston, Tex., under the trade designation Kraton G1701X; (2) a styrene-ethylene propylene block copolymer having a styrene to rubber ratio of about 0.39 and available from the Shell Chemical Company under the designation G1702X; (3) styrene-ethylene butylene-styrene block copolymer (SEBS), unplasticized, and having a styrene/rubber ratio of about 0.15 or 0.41 available from the Shell Chemical Corporation under the trade designation Kraton G1657 or G1650 respectively; and (4) diblock or multi-arm copolymers of ethylene and propylene (EP) available from the Shell Chemical Company under the designation G1750X or G1765X. Furthermore, yet another copolymer which may be used is Kraton 17216X copolymer (SEBS) which has a styrene/rubber ratio of about 0.43. The preferred embodiment includes Kraton G 1701X block copolymer.

Also included in the composition of the filling material 26 is an antioxidant system in the amount of about 1–2% by weight. The antioxidant constituents are hindered phenolic antioxidants which are relatively soluble in mineral oil. An acceptable antioxidant is one available from the Ciba-Geigy Company under the trade designation Irganox 1076. In a preferred embodiment, the filling material includes 1.6% by weight of Irganox 1076 antioxidant and 0.2% by weight of Irganox 1035 antioxidant, the latter constituent being used to achieve synergistic effect. Alternatively, 2% by weight of Irganox 1076 may be used in lieu of a mixture of Irganox 1035 and Irganox 1076.

The solubility of Irganox 1035 antioxidant in mineral oil is about 0.30 g/100 ml, and in polyalphaolefin is about 0.20 g/100 ml. The solubility of Irganox 1076 in the mineral oil is 12 g/100 ml, and about 10 g/100 ml in a polyalphaolefin at 22° C. Because of the use of the combination of oils, the filling material does not need as much concentration of the antioxidants as compared to the prior art. A complete antioxidant or thermal stabilization system would have, typically, consisted of a primary antioxidant, such as Irganox 1076 and a secondary antioxidant such as Irganox 1035, in order to have a synergistic effect. Other suitable non-precipitating antioxidants include Irganox 1520 and Irganox 1010, also available from the Ciba Geigy Company.

Exemplary compositions of acceptable filling materials of this invention are shown in TABLE 1, with the constituents being given in percent by weight.

TABLE 1

| | Hydrocarbons | | | Copolymers | | Fumed Silicas | | | | | Antioxidant | |
|---|---|---|---|---|---|---|---|---|---|---|---|---|
| | SHF 82 | SHF 402 | Kaydol | Kraton G1701 | Kraton G1750 | Cab-o-sil TS 610 | Cab-o-sil TS 720 | Aerosil R974 | Aerosil R972 | Aerosil US204 | Aerosil R202 | Irganox 1035 | Irganox 1076 |
| A | 67.5 | 20.1 | | 6.6 | | 2 | 2 | | | | | 0.3 | 1.5 |
| B | 69.6 | 19.6 | | 4.5 | | 2.5 | 2 | | | | | 0.2 | 1.6 |
| C | 67.5 | 20.1 | | | 6.6 | 2 | 2 | | | | | 0.3 | 1.5 |
| D | 69 | 19.5 | | 5 | | 2.5 | 2.2 | | | | | 0.2 | 1.6 |
| E | 69 | 19.5 | | 5 | | | | 4.7 | | | | 0.2 | 1.6 |
| F | 69 | 19.5 | | 5 | | | | | 4.7 | | | 0.2 | 1.6 |
| G | 69 | 19.5 | | 5 | | | | | | 4.7 | | 0.2 | 1.6 |
| H | 35.8 | 53.6 | | 4.5 | | | | 2.3 | 2.2 | | | 0.1 | 1.5 |
| I | 53.6 | 35.8 | | 4.5 | | | | 4.5 | | | | 0.1 | 1.5 |
| J | 53.6 | 35.8 | | 4.5 | | | | | 4.5 | | | 0.1 | 1.5 |
| K | 35.8 | 53.6 | | 4.5 | | | | 4.5 | | | | 0.1 | 1.5 |
| L | 40 | 26.6 | 22.2 | 4.5 | | 5 | | | | | | 0.2 | 1.5 |
| M | 53.3 | 13.3 | 22.2 | 4.5 | | 5 | | | | | | 0.2 | 1.5 |

TABLE 2 quantifies the experimental measurements of viscosity, oil separation, critical-yield stress and drip temperature test passed for each of the filling material compositions set forth in Table 1.

TABLE 2

| | Helipath Viscosity 3 +/− 1 days (Tb Unit) | Oil Separation (%) | Yield Stress @ 20° C. (psi) | Drip Test Passing Temp (°C.) |
|---|---|---|---|---|
| A | 18.9 | 0 | 0.0011 | 80 |
| B | 13.2 | 0 | 0.0011 | 80 |
| C | 12.2 | 0 | 0.0011 | 80 |
| D | 17 | 0 | 0.0016 | 80 |
| E | 14.6 | 0 | 0.0016 | 80 |
| F | 11.4 | 0 | 0.0011 | 80 |
| G | 12.1 | 0 | 0.0011 | 80 |
| H | 13.6 | 2.58 | 0.0011 | 80 |
| I | 12.1 | 2.3 | 0.0016 | 80 |
| J | 12.2 | 3.6 | 0.0016 | 80 |
| K | 18.2(Ta) | 3.42 | 0.0011 | 80 |
| L | 18.1 | 0 | 0.0011 | 80 |
| M | 18.8 | 0 | 0.0016 | 80 |

FIG. 3 shows a generalized stress-strain curve 37 at constant strain rate for a thixotropic material such as that used as the filling material 26 and identifies several important parameters. Along a segment 38 of the stress-strain curve 37, the material acts essentially as an elastic solid. The segment extends from zero stress to the critical-yield stress $\sigma_c$. The strain corresponding to $\sigma_c$ is identified as $\gamma_c$, the critical shear strain. By definition, the coordinates $\sigma_c$ and $\gamma_c$ indicate the onset of yielding and the quantity $\sigma_c/\gamma_c$ (or $d\sigma/d\gamma$ for $\gamma<\gamma_c$) is known as the shear modulus, $G_e$, the material.

A segment 39 of the stress-strain curve of FIG. 3 represents increasing values of incremental strain for increasing stress. The stress $\sigma_y$ is the maximum value of stress sustainable by the material at a given strain rate with $\gamma_y$ being the corresponding strain. For strains in excess of $\gamma_y$, the stress at first decreases as shown by a segment 40, becoming substantially independent of strain for still greater values of strain as shown by a segment 41. The filling material thus exhibits a liquid-like behavior for $\sigma > \sigma_y$.

The composition of the filling material 26 of the present invention unexpectedly results in excellent properties. It would be expected that to increase the drip temperature, the yield stress and the viscosity would have to be increased, perhaps to unacceptable levels. Unexpectedly, the filling material of a cable made in accordance with this invention provides excellent results notwithstanding its relatively low viscosity. The thickening system, even when two different fumed silicas are used, performs several functions; not only does it reduce oil separation, the thickening system also keeps the viscosity low and decreases the yield stress when compared to what has been taught to date by prior art.

Also, by mixing hydrocarbons, only a low level of antioxidant system is needed to achieve the same thermal stability as the prior art. It should be observed, however, that the level of the antioxidant constituent is still relatively high as compared to compositions commonly employed in other systems such as paints or oils. The main purpose for this is to provide a reservoir of antioxidants to counter the migration loss of the antioxidants and to increase the oxidative stability of the tubular member 28 and optical fiber coatings to prevent premature degradation of the optical fiber cable.

The filling material 26 of this invention also has enhanced performance at low temperature because of the use of a combination of oils having low resulting pour point, has a high cable drip temperature and very low oil separation. The filling material 26 is compatible with presently used fiber coating materials and other cable materials which it contacts. There is no bleeding or separation of oil and it is expected that the optical loss at –40° C. will be less than that of the prior art filling materials.

The test results from the prior art show that at least one filling material made with an increase in fumed silica level in mineral oil, although reducing the oil separation and greatly increasing the viscosity, was still unable to pass the 65° C. cable drip test. In this regard, it is noted that passing an 80° C. cable drip test is currently required by at least one standards organization. Apparently, the use of just one fumed silica as the only thickening agent in a mineral oil-based filling material cannot enable a cable to pass the drip test without an adverse increase of viscosity and/or critical-yield stress. To avoid this result, the present invention uses a combination of fumed silicas in conjunction with a thermoplastic rubber.

It is to be understood that the above-described arrangements are simply illustrative of the invention. Other arrangements may be devised by those skilled in the art which will embody the principles of the invention and fall within the spirit and scope thereof.

What is claimed is:

1. An optical fiber cable, said optical fiber cable comprising:

a core comprising at least one optical fiber transmission medium;

a sheath system which is disposed about said core; and a filling material which is disposed in said core, said filling material comprising 1) a hydrocarbon system which contains at least two different hydrocarbons selected from the group consisting of two synthetic oils and two mineral oils, wherein the viscosity values of the two different hydrocarbons are separated by at least about three centistrokes at 100° C.; and 2) a thickening system.

2. The optical fiber cable of claim 1 wherein the thickening system comprises an inorganic constituent and a polymer.

3. The optical fiber cable of claim 2 wherein the inorganic constituent of the thickening system comprises a fumed silica.

4. The optical fiber cable of claim 3 wherein the inorganic constituent of the thickening system comprises at least two different fumed silicas.

5. The optical fiber cable of claim 2 wherein the polymer within the thickening system comprises a diblock copolymer comprising a polystyrene block and a poly (ethylene-propylene) block having a styrene-rubber ratio in the range of about 0.1 to 0.9.

6. The optical fiber cable of claim 2 wherein the polymer within the thickening system comprises a linear copolymer comprising a styrene-ethylene-butylene-styrene block.

7. The optical fiber cable of claim 2 wherein the polymer within the thickening system comprises a multi-arm copolymer comprising a poly (ethylene-propylene) block.

8. The optical fiber cable of claim 1 wherein the viscosity values of both of the two different hydrocarbons is greater than about 4 centistrokes at 100° C. and the less than about 300 centistrokes at 100° C.

9. The optical fiber cable of claim 4 wherein the viscosity values of both of the two different hydrocarbons is greater than about 8 centistrokes at 100° C. and the less than about 40 centistrokes at 100° C.

10. The optical fiber cable of claim 1 wherein the viscosity value of one of the two different hydrocarbons is greater than 20 centistrokes at 100° C. and the viscosity value of the other of the two different hydrocarbons is less than 20 centistrokes at 100° C.

11. The optical fiber cable of claim 1 wherein the hydrocarbon system comprises at least 80 percent by weight of the filling material.

12. The optical fiber cable of claim 1 wherein the synthetic oils are selected from the group consisting of polyalphaolefins, polyglycols, polybutenes, polyisobutylenes, polypropenes and silicone oils.

13. The optical fiber cable of claim 1 wherein the mineral oils are selected from the group consisting of:

i. paraffinic oil having a minimum specific gravity of about 0.86 and a pour point less than –4° C. and being of ASTM type 103, 104A or 104B; and ii. naphthenic oil having a minimum specific gravity of about 0.86 and a pour point less than –40° C. and being of ASTM type 103, 104A or 104B.

14. The optical fiber cable of claim 1 further comprising an antioxidant which comprises a high molecular weight, hindered phenolic antioxidant.

15. A composition of matter which is suitable for filling optical fiber cables, said composition comprising:

a hydrocarbon system which contains at least two different hydrocarbons selected from the group consisting of two synthetic oils and two mineral oils, wherein the viscosity values of the two different hydrocarbons are separated by at least about three centistrokes at 100° C.; and a thickening system.

16. The composition of matter of claim 15 wherein the thickening system comprises an inorganic constituent and a polymer.

17. The composition of matter of claim 16 wherein the inorganic constituent of the thickening system comprises a fumed silica.

18. The composition of matter of claim 17 wherein the inorganic constituent of the thickening system comprises at least two different fumed silicas.

19. The composition of matter of claim 16 wherein the polymer within the thickening system comprises a diblock copolymer comprising a polystyrene block and a poly (ethylene-propylene) block having a styrene-rubber ratio in the range of about 0.1 to 0.9.

20. The composition of matter of claim 16 wherein the polymer within the thickening system comprises a linear copolymer comprising a styrene-ethylene-butylene-styrene block.

21. The composition of matter of claim 16 wherein the polymer within the thickening system comprises a multi-arm copolymer comprising a poly (ethylene-propylene) block.

22. The composition of matter of claim 15 wherein the mineral oils are selected from the group consisting of:
   i. paraffinic oil having a minimum specific gravity of about 0.86 and a pour point less than −40° C. and being of ASTM type 103, 104A or 104B; and
   ii. naphthenic oil having a minimum specific gravity of about 0.86 and a pour point less than −40° C. and being of ASTM type 103, 104A or 104B.

23. The composition of matter of claim 15 wherein the viscosity value of one of the two different hydrocarbons is greater than 20 centistrokes at 100° C. and the viscosity value of the other of the two different hydrocarbons is less than 20 centistrokes at 100° C.

24. The composition of matter of claim 15 wherein the viscosity values of both of the two different hydrocarbons is greater than about 4 centistrokes at 100° C. and the less than about 300 centistrokes at 100° C.

25. The composition of matter of claim 15 wherein the viscosity values of both of the two different hydrocarbons is greater than about 8 centistrokes at 100° C. and the less than about 40 centistrokes at 100° C.

26. The composition of matter of claim 15 wherein the hydrocarbon system comprises at least 80 percent by weight of the composition of matter.

27. The composition of matter of claim 15 wherein the synthetic oils are selected from the group consisting of polyalphaolefins, polyglycols, polybutenes, polyisobutylenes, polypropenes and silicone oils.

28. The composition of matter of claim 15 further comprising an antioxidant which comprises a high molecular weight, hindered phenolic antioxidant.

29. An optical fiber cable, said optical fiber cable comprising:
   a core comprising at least one optical fiber transmission medium;
   a sheath system which is disposed about said core; and
   a filling material which is disposed in said core, said filling material comprising 1) a thickening system which includes at least two different fumed silicas; and 2) at least one hydrocarbon.

30. The optical fiber cable of claim 29 wherein the hydrocarbon(s) comprise at east 80 percent by weight of the filling material.

31. The optical fiber cable of claim 30 wherein the synthetic oil is selected from the group consisting of polyalphaolefins, polyglycols, polybutenes, polyisobutylenes, polypropenes and silicone oils.

32. The optical fiber cable of claim 30 wherein the mineral oil is selected from the group consisting of:
   i. paraffinic oil having a minimum specific gravity of about 0.86 and a pour point less than −40° C. and being of ASTM type 103, 104A or 104B; and
   ii. naphthenic oil having a minimum specific gravity of about 0.86 and a pour point less than −4° C. and being of ASTM type 103, 104A or 104B.

33. The optical fiber cable of claim 29 wherein the thickening system further comprises an inorganic constituent and a polymer.

34. The optical fiber cable of claim 33 wherein the polymer within the thickening system comprises a multi-arm copolymer comprising a poly (ethylene-propylene) block.

35. The optical fiber cable of claim 30 wherein the polymer within the thickening system comprises a diblock copolymer comprising a polystyrene block and a poly (ethylene-propylene) block having a styrene-rubber ratio in the range of about 0.1 to 0.9.

36. The optical fiber cable of claim 33 wherein the polymer within the thickening system comprises a linear copolymer comprising a styrene-ethylene-butylene-styrene block.

37. The optical fiber cable of claim 29 wherein the at least one hydrocarbon is selected from the group consisting of synthetic oils, mineral oils and a mixture comprising synthetic oils and/or mineral oils.

38. The optical fiber cable of claim 29 further comprising an antioxidant which comprises a high molecular weight, hindered phenolic antioxidant.

39. A composition of matter which is suitable for filling optical fiber cables, said composition comprising:
   a thickening system which includes at least two different fumed silicas; and
   at least one hydrocarbon.

40. The composition of matter of claim 39 wherein the at least one hydrocarbon is selected from the group consisting of synthetic oils, mineral oils and a mixture comprising synthetic oils and/or mineral oils.

41. The composition of matter of claim 40 wherein the synthetic oil is selected from the group consisting of polyalphaolefins, polyglycols, polybutenes, polyisobutylenes, polypropenes and silicone oils.

42. The composition of matter of claim 40 wherein the mineral oil is selected from the group consisting of:
   i. paraffinic oil having a minimum specific gravity of about 0.86 and a pour point less than −4° C. and being of ASTM type 103, 104A or 104B; and
   ii. naphthenic oil having a minimum specific gravity of about 0.86 and a pour point less than −4° C. and being of ASTM type 103, 104A or 104B.

43. The composition of matter of claim 39 wherein the thickening system further comprises an inorganic constituent and a polymer.

44. The optical fiber cable of claim 43 wherein the polymer within the thickening system comprises a multi-arm copolymer comprising a poly (ethylene-propylene) block.

45. The composition of matter of claim 43 wherein the polymer within the thickening system comprises a diblock copolymer comprising a polystyrene block and a poly (ethylene-propylene) block having a styrene-rubber ratio in the range of about 0.1 to 0.9.

46. The optical fiber cable of claim 43 wherein the polymer within the thickening system comprises a linear copolymer comprising a styrene-ethylene-butylene-styrene block.

47. The composition of matter of claim 39 wherein the hydrocarbon(s) comprise at least 80 percent by weight of the composition of matter.

48. The composition of matter of claim 39 further comprising an antioxidant which comprises a high molecular weight, hindered phenolic antioxidant.

49. An optical fiber cable, said optical fiber cable comprising:

a core comprising at least one optical fiber transmission medium;

a sheath system which is disposed about said core; and a filling material which is disposed in said core, said filling material comprising a thickening system including at least two different fumed silicas and a polymer, said filling material being capable of passing EIA/TIA Standard FOTP-81, Compound Flow (Drip) Test for Filled Optical Cable, Section 8 up to 80° C. and has a critical-yield stress of less than about 0.002 psi (13.8 Pa).

50. An optical fiber cable of claim 49 wherein the filling material has an oil separation value of less than about 10%.

51. An optical fiber cable of claim 49 wherein the filling material comprises 1) a hydrocarbon system which contains at least two different hydrocarbons selected from the group consisting of two synthetic oils and two mineral oils, wherein the viscosity values of the two different hydrocarbons are separated by at least about three centistokes at 100° C; and 2) a thickening system which comprises an inorganic constituent and a polymer.

* * * * *